(12) United States Patent
Rameshni et al.

(10) Patent No.: US 7,927,577 B2
(45) Date of Patent: Apr. 19, 2011

(54) SULFUR COLLECTION SYSTEMS AND PROCESSES WITH INTEGRATED DEGASSING

(75) Inventors: Mahin Rameshni, Monrovia, CA (US); Stephen L. Santo, La Crescenta, CA (US)

(73) Assignee: Worleyparsons Group, Inc., Arcadia, CA (US)

( * ) Notice: Subject to any disclaimer, the term of this patent is extended or adjusted under 35 U.S.C. 154(b) by 0 days.

(21) Appl. No.: 12/686,346

(22) Filed: Jan. 12, 2010

(65) Prior Publication Data

US 2010/0178236 A1 Jul. 15, 2010

Related U.S. Application Data

(60) Provisional application No. 61/143,989, filed on Jan. 12, 2009.

(51) Int. Cl.
*C01B 17/02* (2006.01)

(52) U.S. Cl. .................................. 423/567.1; 423/578.1

(58) Field of Classification Search ............... 423/567.1, 423/578.1
See application file for complete search history.

(56) References Cited

U.S. PATENT DOCUMENTS

| | | | |
|---|---|---|---|
| 4,002,728 A | 1/1977 | DeMay | |
| 4,423,025 A | 12/1983 | Ledford et al. | |
| RE32,009 E | 10/1985 | Ledford et al. | |
| 4,729,887 A | 3/1988 | Pendergraft | |
| 4,849,204 A | 7/1989 | Voirin et al. | |
| 5,004,591 A | 4/1991 | Maurice et al. | |
| 5,030,438 A | 7/1991 | Voirin et al. | |
| 5,080,695 A | 1/1992 | Kassarjian | |
| 5,632,967 A | 5/1997 | Nasato | |
| 5,935,548 A | 8/1999 | Franklin et al. | |
| 7,470,350 B2 | 12/2008 | Bonnett et al. | |
| 2010/0178236 A1* | 7/2010 | Rameshni et al. | 423/578.4 |

FOREIGN PATENT DOCUMENTS

| | | |
|---|---|---|
| CA | 1002730 A1 | 1/1977 |
| WO | 02/088023 A1 | 7/2002 |

* cited by examiner

*Primary Examiner* — Timothy C Vanoy
(74) *Attorney, Agent, or Firm* — Locke Lord Bissell & Liddell LLP

(57) ABSTRACT

Systems and methods for the collection of liquid sulfur with integrated degassing are described, wherein the system and methods include the use of one or more liquid jet pumps or eductors employing a pumped liquid sulfur recycle stream as motive fluid to boost sulfur rundown pressure. The new invention eliminates piping constraints inherent with conventional gravity flow, thus permitting location of the sulfur collection vessel above ground and remote from the sulfur recovery unit. In addition, the described methods provide entrainment and enough agitation in the liquid sulfur such that simultaneously degassing occurs within the sulfur collection piping and associated systems described herein. The instant systems and methods are integrated with the degassing system, meaning that the sulfur will be initially degassed during the collection process, and then further degassing occurs by the methods described herein.

20 Claims, 5 Drawing Sheets

SULFUR COLLECTION SYSTEMS AND PROCESSES WITH INTEGRATED DEGASSING

CROSS REFERENCE TO RELATED APPLICATIONS

The present application claims priority to U.S. Provisional Patent Application Ser. No. 61/143,989, filed Jan. 12, 2009, the contents of which are incorporated herein by reference.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

1. Field of the Invention

The inventions disclosed and taught herein relate generally to processes for the collection of liquid sulfur and removal of hydrogen sulfide ($H_2S$) and related gases by degassing liquid sulfur. More specifically, the inventions disclosed herein are related to processes for the collection of liquid sulfur produced in a Claus unit or similar sulfur recovery unit while simultaneously degassing the sulfur and removing the liquid sulfur produced, preferably using an above-ground system that includes the use of a liquid jet pump or eductor and the pumping of the sulfur to a storage vessel, using a portion of the liquid sulfur as a jet or eductor motive fluid.

2. Description of the Related Art

The Claus process is a well known process for producing elemental sulfur by reacting hydrogen sulfide and sulfur dioxide. Typically, hydrogen sulfide from gas plants, sour gas field developments, in refinery product gases, or from any other similar facilities which produce $H_2S$ is partially combusted to produce sulfur dioxide, which then reacts with the unburned hydrogen sulfide to yield sulfur and water. The sulfide is condensed and recovered. Suitable catalysts may also be used to promote the sulfur production.

The basic chemistry of the Claus process is as follows:

$$H_2S + \tfrac{3}{2}O_2 \rightarrow SO_2 + H_2O \tag{1}$$

$$2H_2S + SO_2 \rightarrow \tfrac{3}{8}S_8 + 2H_2O \tag{2}$$

Hydrogen sulfide is soluble in liquid sulfur. The dissolved hydrogen sulfide may react with the sulfur diradical chain species to form hydrogen polysulfides, as follows:

$$H_2S + S_{x-1} \rightarrow H_2S_x \tag{3}$$

The conversion rate of hydrogen polysulfide back to hydrogen sulfide is generally very low.

One problem thus associated with the Claus process is the presence in the produced liquid sulfur of dissolved hydrogen sulfide. The liquid sulfur removed from the process gas stream in each condenser will contain dissolved $H_2S$ in the form of hydrogen polysulfide ($H_2S_x$) and $H_2S$ in equilibrium with the process gas. If this dissolved $H_2S$ is not removed, it can evolve from the sulfur product during storage and/or transportation, creating potentially hazardous conditions. Degassing the sulfur to reduce the $H_2S$ content considerably reduces the potential hazards, and also improves the performance of sulfur forming and grinding processes. Numerous degassing processes involve the agitation of the liquid sulfur and removal of the evolved $H_2S$ with a sweep gas. Generally, air is used as the sweep gas since oxygen helps to release the $H_2S$ from the polysulfide molecule. The main parameters which are typically taken into consideration for the sulfur degassing are the total hydrogen sulfide and hydrogen polysulfide content in the sulfur to be degassed, as well as the properties of these components which are dissolved in the sulfur. As indicated above, the hydrogen sulfide contaminates the products and may pose serious hazards. For example, molten sulfur from conventional sulfur recovery sources may typically contain as much as 700 parts per million by weight (ppmw as $H_2S$) of dissolved, free $H_2S$ and hydrogen polysulfides. At these levels, hydrogen sulfide may create nuisance odors in the vicinity of the liquid sulfur, and may also reach toxic levels when loading and unloading the sulfur. Furthermore, when storing liquid sulfur in tanks or other vessels, a threat exists that the lower explosive limit of hydrogen sulfide in air may be reached.

Typically, sulfur produced from a Claus sulfur plant may contain from about 150 to about 450 ppmw (parts per million by weight) of equivalent hydrogen sulfide which may evolve with time in the storage facilities such as pits, tanks, tank trucks, and/or tank cars and accumulate in the vapor phase creating unsafe conditions. For instance, hydrogen sulfide can escape out of the storage device resulting in a release to the atmosphere. Hydrogen sulfide in the vapor phase of a storage device may build up to a level exceeding its lower explosive limit and cause an explosion. Sulfur storage explosions have occurred in the industry.

To eliminate these and other problems, a number of methods have been suggested or developed that remove hydrogen sulfide from liquid sulfur. Release of dissolved hydrogen sulfide has been carried out by agitating the liquid sulfur by various means, including mechanical agitation, spraying, bubbling air through the liquid sulfur, and by circulating the sulfur over a stripping column. The released hydrogen sulfide is often removed from the pit gas space by a "sweep gas," which typically may be any suitable gas such as air, Claus tail gas, carbon dioxide, steam, or an inert gas such as argon or nitrogen.

For example, U.S. Pat. No. 5,080,695, issued in 1992 to Kassarjian, describes a method of removing hydrogen sulfide from liquid sulfur wherein the liquid sulfur is caused to flow continuously through a seal pot where it is contacted by a counter-flowing inert gas, thereby stripping hydrogen sulfide from the sulfur. The inert gas, which is typically nitrogen, flows back to the Claus process. One problem with the method described in this patent is that selection of the degassing agent is restricted to inert gases which have been demonstrated to be less effective degassing agents than oxygen-containing gas streams, such as air. Since the spent gas is returned to the overall, primary process in the '695 patent, an oxygen containing gas, such as air, cannot be used due to adverse process impact and safety concerns.

It is a disadvantage of some modern, commercial degassing processes that they require large, complex and, accordingly, expensive equipment. For example, in one process, known as the 'Shell process,' degassing takes place in a storage tank or sulfur pit equipped with vertical stripping columns, where liquid sulfur is vigorously agitated by bubbling sparged air through the column at atmospheric pressure in order to induce sulfur recirculation. The stripping columns are open at the top and bottom to allow the sulfur to circulate at a rate of a few hundred times per hour. The sparge air, together with an additional flow of air, is then used as a low pressure sweep gas to displace the gases produced by the degassing process. The low pressure gases so produced are then fed to an incinerator where the $H_2S$ is oxidized to $SO_2$ and released to the atmosphere. Depending on the design, a liquid or gaseous catalyst, such as ammonia, ammonium thiosulfate, urea, morpholine, or an alkanol amine may be added to accelerate the decomposition of the polysulfide into $H_2S$.

U.S. Pat. No. 5,632,967 to Goar, Allison & Associates describes what is known in the industry as the "D'GAASS" process. This patent discloses a process for degassing liquid sulfur under pressure. According to the specification, a stream of liquid sulfur containing polysulfides and hydrogen sulfide and a stream of an oxidizing gas are introduced into a vessel and intimately mixed to provide intimate contact between the two streams. The streams are passed through the vessel at a pressure of at least about 40 psig and at a temperature and for a residence time sufficient to remove substantially all of the polysulfides and hydrogen sulfide from the liquid sulfur.

An alternative process, described by the Societe Nationale Elf Aquatane and known as the 'SNEA process', catalytically accelerates polysulfide decomposition using ammonia or a variety of heterocyclic amines and an optional surfactant, as described in U.S. Pat. Nos. 4,849,204; 5,004,591 and 5,030,438. In this process, degassing takes place by repeated circulation and spraying of the liquid sulfur into the sulfur pit. Release of dissolved $H_2S$ is achieved by spraying liquid sulfur through jets at a specific velocity. After the $H_2S$ gas is released, it is removed by a sweep gas and fed to an incinerator. Both the stripping columns used in the Shell process and the circulation/spraying equipment used in the SNEA process are costly and require a large amount of space. Further, it is a disadvantage of both processes that they require the additional step of having to incinerate the $H_2S$-containing sweep gases. In recent years, the catalysts used in these processes have been banned for use by many countries around the world, due to human safety and handling concerns and more stringent environmental regulations.

Other processes which have been described include the use of a fixed-bed alumina catalyst optionally impregnated with an inorganic metal sulfide, or a cobalt-molybdenum impregnated alumina catalyst to catalyze the oxidation of polysulfide in combination with air-stripping.

It is another disadvantage of modern, commercial degassing processes that they require a relatively long retention time in the sulfur pit. For example, the Shell process described above typically requires the liquid sulfur to be recirculated through the stripping columns for about twenty to about twenty-four hours, while the SNEA process typically requires the liquid sulfur to be recirculated through the spray jets for about twenty-four to about thirty hours.

Presently, most industrial facilities remove hydrogen sulfide from the liquid sulfur by injecting a gas, such as air, nitrogen or steam in the pit where liquid sulfur is stored. Some have installed elaborately designed nozzles inside the pit itself for enhanced gas dispersion within the pit.

However, installation or replacement of air sparging or mixing equipment in a storage device such as a pit requires emptying out the entire sulfur inventory. This typically requires shutting down the entire sulfur unit for several days because of the highly corrosive, and pyrophoric environment in the pit. The pit should be depleted of any sulfur and made safe before human personnel may enter and make the installation. Other problems exist with known methods for reducing the amount of hydrogen sulfide in liquid sulfur. Further, several of the degassing processes described above have common problems and similar limitations inherent with conventional sulfur collection systems, such that as sulfur flows by conventional gravity methods from condensers through the sulfur seal or similar device to a storage vessel, they may suffer from additional disadvantages such as conduit plugging, gravity flow constraints, and hydraulic limitations for sulfur collection, necessitating location of the collection pit or vessel near the sulfur plants and below grade, with limited flexibility for sulfur collection.

The inventions disclosed and taught herein are directed to an improved system for liquid sulfur collection from process gas streams with a degassing process, and methods for such improved sulfur collection using these systems.

BRIEF SUMMARY OF THE INVENTION

The present disclosure relates to processes for collecting sulfur from sulfur recovery processes and process gas streams, such as from Claus-type plants, using integrated sulfur collection and degassing techniques.

In accordance with a first aspect of the present disclosure, a method for the removal of hydrogen sulfide from a liquid sulfur stream is described, wherein the method comprises contacting a liquid sulfur stream from one or more sulfur condensers with a sulfur liquid seal and/or sulfur trap, and then with one or more eductors or liquid jet pumps, combining the eductor discharges into a single header assembly, subjecting the discharges in the header assembly to intimate and turbulent mixing which accelerates polysulfide decomposition, separating the $H_2S$ from the liquid sulfur, transferring the liquid sulfur to a collection vessel which is preferably above-ground by way of a liquid distributor to maintain turbulence, and transferring the degassed liquid sulfur to secondary storage or a transportation vessel. In accordance with this aspect of the present disclosure, the $H_2S$ separated from the liquid sulfur as a vent stream may flow to an incinerator, SRU, or TGU under the pressure of the instant processes as presented herein. In accordance with these embodiments, the operating pressures may range from about zero to about 55 psig, preferably from about 5 psig to about 25 psig.

In accordance with a further aspect of the present disclosure, a process for degassing liquid sulfur containing polysulfides and hydrogen sulfide is described, wherein the process comprises the steps of introducing under pressure one or more streams of liquid sulfur containing polysulfides and hydrogen sulfide into one or more eductors via one or more sulfur traps or sulfur liquid seals/valves; mixing the liquid streams exiting from the eductors in a header assembly so as to provide intimate contact between the two streams; passing the streams while in intimate contact with one another through a below- or an above-ground sulfur vessel while maintaining a pressure at about 5 psig, at a temperature and for a treatment time sufficient to remove substantially all of the polysulfides and hydrogen sulfide from the liquid sulfur and to produce a stream of degassed liquid sulfur and a stream of waste effluent gas; and, discharging the degassed liquid sulfur from the vessel. In accordance with this aspect of the disclosure, the liquid sulfur and the air streams may be introduced under a pressure ranging from about 5 to about 55 psig, inclusive. In further embodiments of this aspect of the disclosure, the degassed liquid sulfur produced by the collection and degassing processes and sulfur collection systems described herein may have a total hydrogen sulfide content of less than about 100 ppmw, and preferably has a total hydrogen sulfide content of less than about 10 ppmw.

In a further aspect of the present disclosure, a process for degassing a liquid sulfur stream is described, wherein the process comprises contacting a liquid sulfur stream containing hydrogen sulfide ($H_2S$) from one or more sulfur condensers with one or more eductors or jet pumps; combining the eductor discharges into a single header assembly; subjecting the discharges in the header assembly to turbulent mixing; separating the $H_2S$ from the liquid sulfur; transferring the liquid sulfur to a collection vessel by way of a liquid distributor to maintain turbulent velocity; and, transferring the degassed liquid sulfur to an appropriate storage assembly. In accordance with this aspect of the present disclosure, the liquid sulfur stream may be first passed through one or more liquid sulfur traps or sulfur liquid seals or valve before entering the eductors. In further accordance with this aspect of the disclosure, the degassed sulfur product has less than about 100 ppmw of hydrogen sulfide ($H_2S$), and more preferably has less than about 10 ppmw of $H_2S$.

In yet another aspect of the present disclosure, a process for degassing liquid sulfur containing polysulfides and hydrogen sulfide is described, wherein the process comprises introducing under pressure one or more streams of liquid sulfur containing polysulfides having the general formula $H_2S_x$ and hydrogen sulfide ($H_2S$) into one or more eductors or jet pumps; mixing the liquid streams exiting from the eductors or jet pumps in a header assembly so as to provide intimate contact between the two streams; passing the two streams while in intimate contact with one another through a sulfur vessel while maintaining a pressure and for a treatment time sufficient to remove substantially all of the polysulfides and hydrogen sulfide from the liquid sulfur and to produce a stream of degassed liquid sulfur and a stream of waste effluent gas; and, discharging the degassed liquid sulfur from the vessel. In accordance with this aspect of the present disclosure, the liquid sulfur stream may be first passed through one or more liquid sulfur traps or sulfur liquid seals or valve before entering the eductors. In further accordance with this aspect of the disclosure, the degassed sulfur product has less than about 100 ppmw of hydrogen sulfide ($H_2S$), and more preferably has less than about 10 ppmw of $H_2S$.

In a further aspect of the present disclosure, methods of collecting individual rundown streams of produced sulfur, such as from the sulfur condensers of a typical Claus sulfur recovery unit, are described, wherein the methods comprise pumping a liquid sulfur recycle stream from a collection vessel to one or more jet pumps or eductors so as to act as a motive fluid to boost the pressure of the rundown liquid stream flowing from a conventional liquid seal or sulfur trap; and, conveying the collective discharge streams from the one or more eductors to a sulfur collection vessel via a common conduit. In accordance with at least this aspect of the disclosure, the sulfur collection vessel may be advantageously operated at positive pressure with a blanket atmosphere of process gas which can be safely vented to the process without an adverse environmental impact, and without the need for a mechanical device such as a blower or eductor. Additionally, in accordance with this and the other methods and processes described herein, all of the rundown and related collection piping, and the collection vessel itself, may be advantageously located above ground, remote from the sulfur recovery unit itself. In further accordance with this aspect of the disclosure, the liquid seals or sulfur traps on individual sulfur rundown streams may be optionally replaced with flow restriction orifices. In further accordance with the method of this aspect, the inherent turbulence within the eductors and downstream piping generates agitation and shear forces conductive to accelerated decomposition of unwanted hydrogen polysulfides, so as to achieve a substantial degree of hydrogen sulfide removal within the collection system itself.

BRIEF DESCRIPTION OF THE SEVERAL
VIEWS OF THE DRAWINGS

The following figures form part of the present specification and are included to further demonstrate certain aspects of the present invention. The invention may be better understood by reference to one or more of these figures in combination with the detailed description of specific embodiments presented herein.

Figure 1:
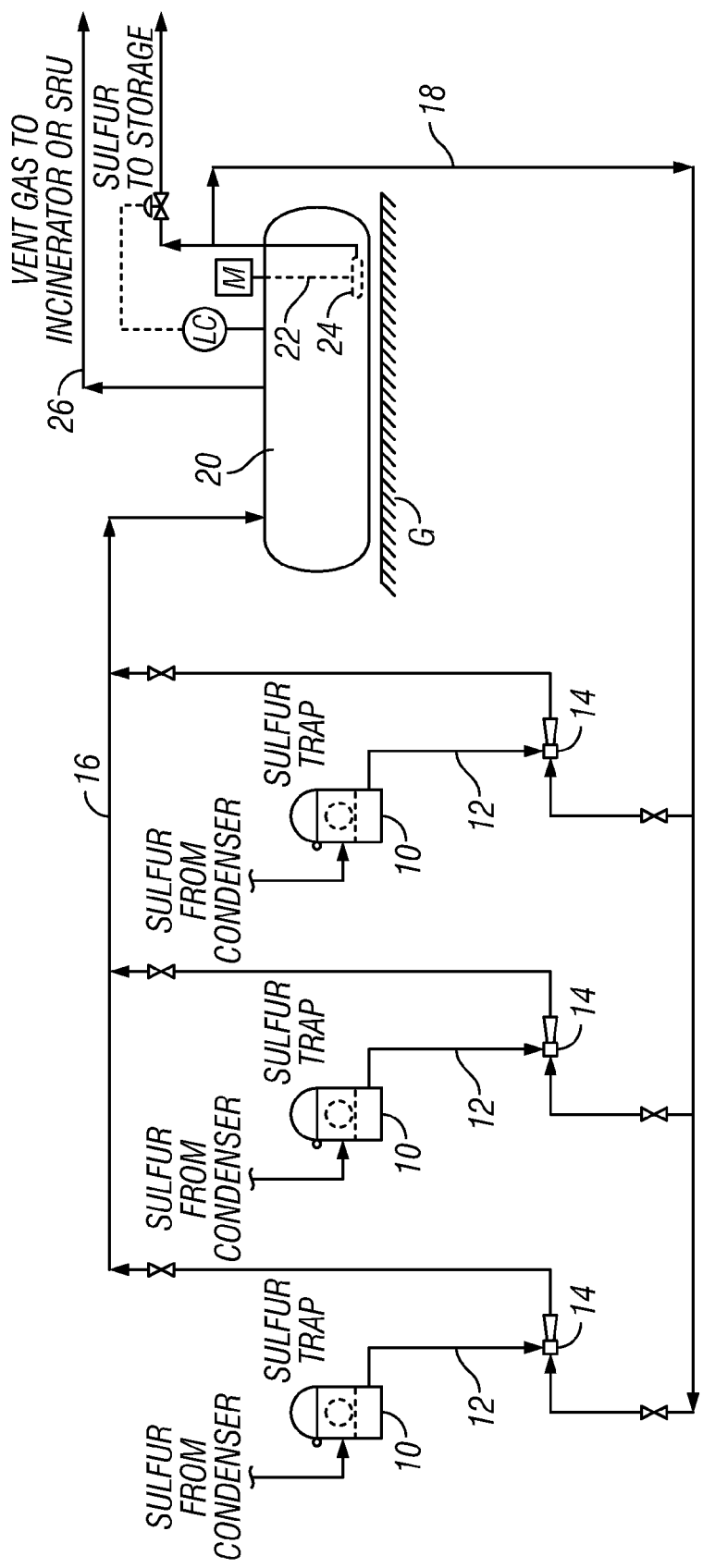
FIG. 1 is a process flow diagram illustrating a sulfur collection process in accordance with an embodiment of the present disclosure.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

As indicated above, in typical operations involving sulfur recovery, the liquid sulfur from the sulfur condensers are normally collected through the sulfur seal or trap to the underground sulfur pit. Then the sulfur is degassed inside or outside of the pit to remove the $H_2S$ and then is transferred to the storage tank for sulfur forming/solidification or is sold in the liquid form. Applicants have created processes for collecting liquid sulfur and simultaneously degassing the sulfur, wherein the processes disclosed herein have a number of advantages over previously known and/or practiced degassing technologies associated with sulfur recovery technologies. For example, and without limitation, using the processes of the present disclosure, the sulfur seal, the sulfur collection system and the sulfur degassing are designed such that the entire system operates preferably above ground, although it could be used to revamp existing underground sulfur pit systems to more reliable and flexible sulfur collection systems. Thus, by using the processes of the present disclosure, there is an improved environmental impact associated with the processes as they do not require excavating the earth for an underground sulfur run down pipe or underground sulfur seal, and there is no underground sulfur pit associated with these processes. In addition, advantageously, the processes of the present disclosure reduce the need to elevate the sulfur plant for the sake of maintaining sulfur rundown piping above ground, as in previous plant arrangements. Rather, the sulfur seals and the sulfur collection systems described here are above ground (alternately referred to as being above-grade, G), a feature which is accomplished by using one or more liquid eductors or liquid jet pumps. In a further advantage of the processes of the present disclosure, the velocity of fluid in the sulfur run-down conduits is higher than conventional sulfur run-down conduits, and therefore the run-down conduits stay cleaner and minimize the risk of plugging. In the event of plugging, as most likely from deposition within the rundown line between the condenser and eductor, the rundown line can be easily back-flushed by temporarily closing the eductor discharge valve. As a result of these advantages, it is envisioned that the processes described herein could be used not only in the design and construction of new sulfur production facilities, but for redesigns of process facilities as well where there is typically limited residence time in the sulfur pit for performing the degassing process, and modifications of the existing process systems are not economically feasible.

As indicated above, at the current time, virtually all the sulfur plants around the world are designed to have the produced sulfur flow by gravity to an underground sulfur pit or vessel, or, if the collection vessel is located above ground, the entire sulfur plant has to be elevated, which in turn is costly. In addition, the sulfur pit has ideally been placed near the sulfur condensers, so as to accommodate the gravity flow constraints and hydraulic limitations of the previous systems. However, as indicated, such a system is rife with problems, including blocked or hindered fluid flow resulting from when the sulfur flows through sulfur seals and creates plugging, catalyst fines buildup, and the potential formation of unwanted iron sulfate corrosion products, all of which translate to increase plant maintenance and decreased productivity.

The processes and systems described herein allow for locating the sulfur collection vessel either above or below ground level, which in turn provides a flexibility of the location of the sulfur pit, allowing for more distance between the vessel and the sulfur plant, as the sulfur is no longer required to flow by gravitational force. Rather, in accordance with the processes described herein, one or more liquid jets or eductors are used for collecting sulfur streams produced from processes such as Claus processes and the like, thereby eliminating the problems associated with using gravity flow for this process.

In addition, the new processes disclosed herein allow for the entrainment and subsequent degassing of the liquid sulfur stream(s) by way of agitation within the sulfur collection system. In accordance with present disclosure, the instantly described processes may be integrated with the degassing system, which means the sulfur will be degassed during the initial collection, and further degassing may occur by the methods described in this invention. In the descriptions that follow below, where appropriate, the same numbers may be used in different illustrations.

Figure 2:
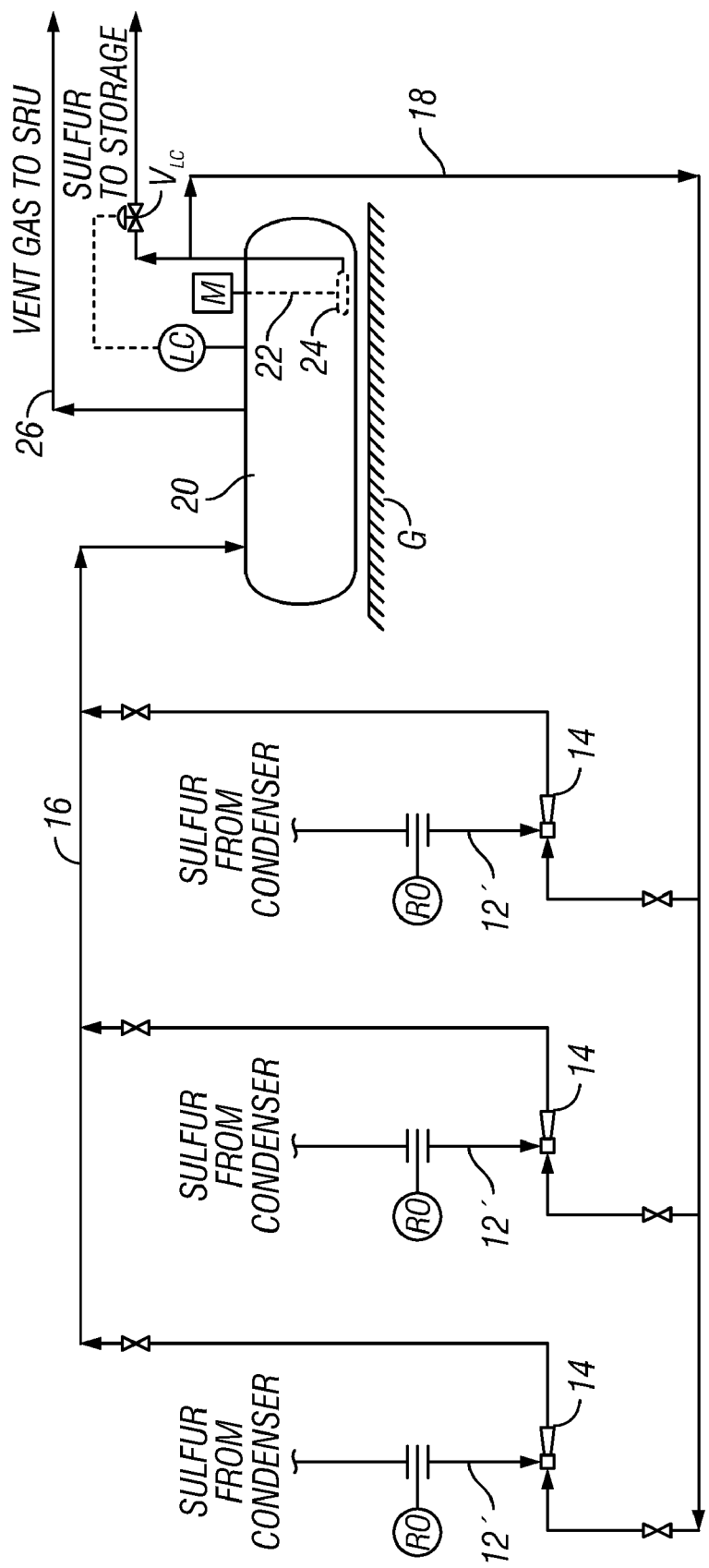
FIG. 2 is a process flow diagram illustrating a further sulfur collection process in accordance with embodiments of the present disclosure.

Turning now to the figures, FIGS. 1 and 2 are illustrations of exemplary processes for liquid sulfur recovery in accordance with the present disclosure. As shown in FIG. 1, the liquid sulfur stream from one or more sulfur condensers, which may come from a variety of sources such as from a Claus process or the like, flows via conduit lines 12 through one or more liquid sulfur seals or sulfur traps 10 to a liquid sulfur eductor 14 (such as the Powell Sulfur Dioxide Eductor available from Powell Fabrication & Manufacturing, Inc., St. Louis, Mich., or GEA Jet Pumps GmbH, Ettlingen, Germany), which acts to boost the suction pressure utilizing the motive force of liquid sulfur provided by recycle motive sulfur stream 18 that is recycled by the sulfur pump from the sulfur collection vessel 20. In accordance with the present disclosure, the liquid eductors or liquid jet pumps 14 which are used in the present processes act to suck a liquid by means of motive liquid jet, mix the motive and suction flows, and then convey the mixed flowing fluid onward towards the next step of the process. As with all jet pumps, the motive liquid has the highest pressure, the suction flow has the lowest pressure, and the pressure of the mixed flow lies between the motive and suction pressures. As indicated above, by using a system as shown in FIG. 1 with sulfur traps 10 and liquid eductors 14 (or liquid jet pumps) in the process as described herein, the need for an underground sulfur seal is eliminated. The type of sulfur trap 10 may be any type of device that is suitable for molten sulfur service, and that allows liquid sulfur to freely drain while preventing the passage of associated process gases, such as the SULTRAP™ (available from Sulfur Operations Support, Houston, Tex., USA).

Continuing with the description of the process in FIG. 1, the eductor 14 discharges are then combined by way of a number of fluid flow pipes or conduits to one header assembly 16, wherein turbulent mixing occurs by way of optimized fluid velocities, and the $H_2S$ is separated from the sulfur. The liquid sulfur then flows to the sulfur collection vessel 20, preferably located above ground (G) (such as an above-ground storage drum, storage tank, or collection drum), through a liquid distributor in order to maintain the turbulent velocity in the liquid for continued degassing, whereafter the vent stream 26 can flow to the incinerator, the sulfur recovery unit (SRU) or the tail gas unit (TGU) without any need for additional process equipment to boost the fluid flow pressure. This can occur because the sulfur collection vessel 20 operates at pressures ranging from about 5 psig to about 55 psig, inclusive. The configuration illustrated in FIG. 1 will remove the $H_2S$ from the liquid sulfur within the storage tank to less than about 100 ppmw of $H_2S$. As shown in the figure, the liquid sulfur within the vessel 20 is agitated by a pump impeller 24 driven by a pump motor (M) connected to pump shaft 22, and after degassing is pumped on level control (LC) via one or more level control valves ($V_{LC}$) from the collection vessel 20 to secondary storage units or transportation vessels. In accordance with the present disclosure, the sulfur collection vessel is typically a horizontal carbon steel pressure vessel with internal steam coils or external steam tracing, and which may be further insulated as appropriate.

In FIG. 2, essentially the same process is illustrated, except that the sulfur traps 10 shown in FIG. 1 have been replaced with simple flow restriction orifices (RO), resulting in a significant cost reduction in the overall process. While some process gas, typically containing unwanted sulfur compounds, will also pass through the flow restriction orifices, it is an advantage of this aspect of the invention that the sulfur collection vessel 20 can be operated at sufficient pressure to vent the entrained gases to, for example, the TGU or even a Claus catalytic stage via flow stream 26, without an adverse environmental impact. The process shown in FIG. 2 is preferable over common conventional systems utilizing, for example, a steam eductor to induce flow of ambient pit sweep air which is subsequently discharged to the SRU reaction furnace, thus requiring a sophisticated and expensive system of automated interlocks to avoid potential reverse flow of hot, toxic process gases from the furnace to the open atmosphere via the sulfur collection pit. In accordance with certain processes of this invention, the sulfur collection vessel 20 preferably (but not necessarily) has only one compartment, and there is only one pump system (comprising, for example, the pump motor (M), shaft (22) and impellor (24)) needed to recycle the sulfur to the eductor 14 and to transfer the degassed sulfur to secondary storage or transportation vehicles. The sulfur recycle pump illustrated in the figures of the instant application may be operated on a level control (LC) of the sulfur collection vessel.

The processes illustrated in FIGS. 1 and 2 result in a product wherein the liquid sulfur contains less than about 100 ppmw of hydrogen sulfide ($H_2S$). The main parameters which are to be taken into consideration for the sulfur degassing are the total $H_2S$ and hydrogen polysulfide content in the sulfur to be degassed and the properties of these components. In accordance with aspects of this invention, the temperature of the liquid sulfur should not exceed about 145° C. (about 293° F.) during the degassing process itself. Additionally, in accordance with the present disclosure, it should be realized that a number of optional steps not shown in the figures may be included in order to increase the overall efficiency of the process. For example, the sulfur lines from the condensers could be back-flushed by simply closing the appropriate valves and isolating the system by circulating the liquid sulfur. This is beneficial because in normal sulfur recovery processes, sulfur pipes are typically cleaned by using liquid sulfur in a distinct, separate process step, while the processes of the present disclosure provide such sulfur conduit cleaning features as an integral part of the overall process design.

Figure 3:
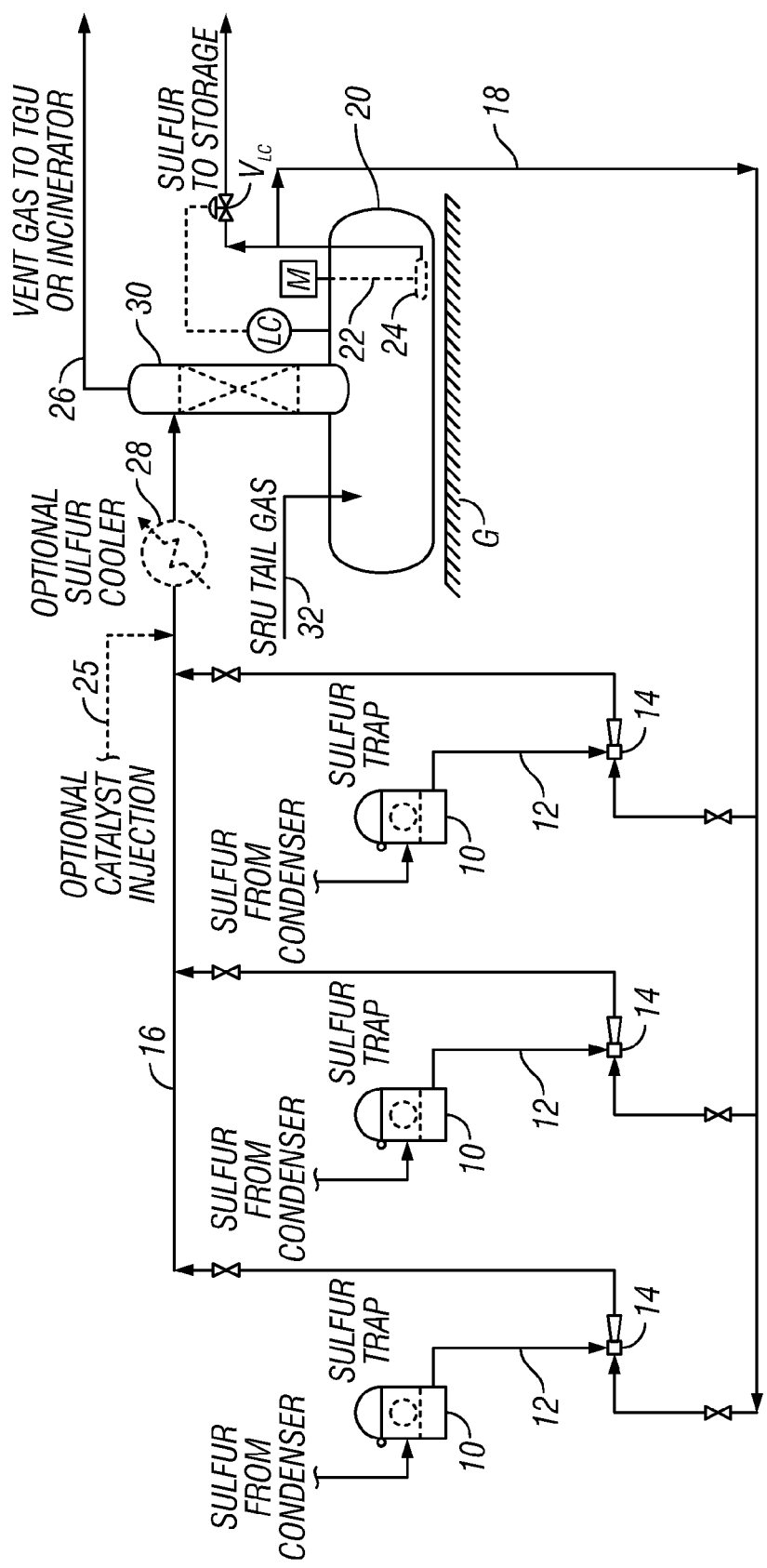
FIG. 3 is a process flow diagram illustrating a sulfur collection process in accordance with one embodiment of the present disclosure, wherein the process includes integrated degassing and tail gas sweep.

Turning now to FIG. 3, an exemplary sulfur collection system in accordance with the present disclosure having an integrated degassing tail gas sweep is illustrated. As shown therein, the liquid sulfur from each sulfur condenser flows, again via an optional seal or trap 10, to the liquid sulfur eductor 14, in order to both remove sulfur impurities and/or to boost the pressure by using liquid sulfur in the recycle (motive) sulfur stream 18 that is recycled by the sulfur pump system (including pump motor M connected to pump impellor 24 via pump shaft 22) from the sulfur collection vessel 20. The liquid sulfur then flows to the sulfur collection vessel 20 through a liquid distributor in order to maintain the turbulent velocity for the degassing step. The discharge from the respective eductors 14 is combined in one common header 16, where again there is turbulent mixing of the liquid sulfur and the residual $H_2S$ is separated from the sulfur. Following intimate mixing within the common header 16, and in accordance with the aspect illustrated in FIG. 3, one or more gaseous or liquid catalysts may be injected into or contacted with the combined sulfur flow stream at point 25 before the stream enters the packed section 30 located above the sulfur collection vessel 20. The catalyst acts to accelerate polysulfide decomposition, thus reducing the required residence time of the sulfur in the sulfur collection vessel itself. As described in more detail below, the one or more catalysts may be as simple as ammonia, or may be any number of amines or nitrogen-containing compounds suitable for this purpose, including a mixture of a primary or secondary amine and morpholine. In a typical process, the catalyst is injected directly into the liquid sulfur pipe using a suitable injection device so as to achieve uniform mixing. A conventional sulfur cooler 28 may optionally be provided to control the temperature of the liquid sulfur prior to its entrance into the collection vessel 20, so as to maintain the sulfur temperature at about 145° C. (293° F.)±5-10° C. for optimum degassing conditions. In accordance with aspects of this disclosure, including the processes illustrated in FIGS. 4 and 5 (discussed in more detail below), any conventional-type cooler 28 may be used to cool the sulfur to a temperature of about 145° C. (293° F.)±5-10° C. The SRU tail gas 32 flows to the bottom of the packed section to establish the contact between the liquid sulfur and the gas stream to sweep the hydrogen sulfide ($H_2S$) from the liquid sulfur and to perform the degassing step. The vent gas stream 26 exiting the packed section 30 contains the tail gas stream, as well as the $H_2S$, which then flows to the tail gas unit or to the incinerator. The sulfur collection vessel 20, as described previously, operates at a pressure ranging from about 5 psig to about 55 psig, inclusive. The degassed sulfur then flows into the sulfur collection vessel, after which it may be pumped to secondary storage or transportation vessels.

With continued reference to FIG. 3, in accordance with the present disclosure, the liquid sulfur may be degassed using the SRU-tail gas stream 32. If the SRU tail gas stream 32 is used to sweep the liquid sulfur, the temperature is preferably less than about 145° C. (about 293° F.). In accordance with an optional feature of this aspect of the disclosure, the aboveground sulfur seal or trap 10 may be optional, and each eductor 14 may be located under the sulfur boot from each condenser with minimum distance, such that if a small amount of the SRU tail gas flows to the eductor 14, it would not cause any problem or effect the overall process. In reference to FIG. 3 and FIG. 4 (discussed in more detail below), the packed section 30 is located at the top of the sulfur collection vessel 20 to provide for intimate mixing of the sulfur and air or SRU tail gas stream 32, thereby improving the overall degassing process. In accordance with aspects of the present disclosure, the packed section 30 may contain any suitable type of packing, such as a random-type packing material, or optionally one or more solid catalysts, such as a Claus-type catalyst.

Figure 4:
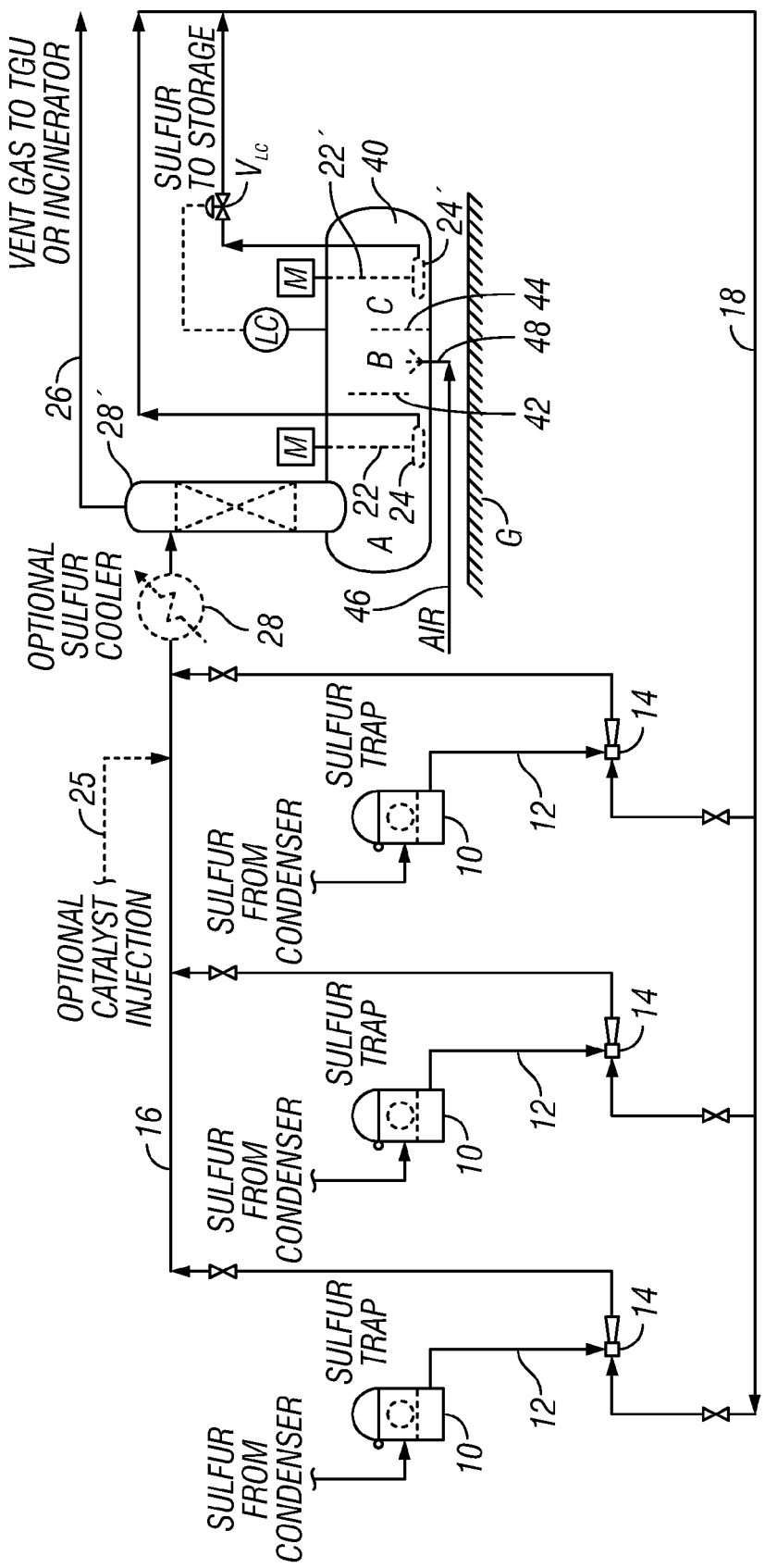
FIG. 4 is a process flow diagram illustrating a further sulfur collection process in accordance with the present disclosure.

With reference now to FIG. 4, the liquid sulfur from each sulfur condenser flows via an optional seal or trap 10 and fluid flow lines 12 to one or more liquid sulfur eductors 14 to boost the pressure therein using the motive liquid sulfur stream 18 recycled by the sulfur pump system from the sulfur collection vessel 40 The eductor 14 discharge is then combined in one common header 16 where there is turbulent mixing of the liquid sulfur, as described previously, and $H_2S$ is separated from the sulfur. The liquid sulfur then flows to the sulfur collection vessel 40 via a liquid distributor 28' in order to maintain the turbulence required for effective degassing. A conventional cooler 28 may optionally be provided to control the temperature of the liquid sulfur prior to its entrance into the packed section of the distributor 28'. In accordance with selected aspects of this embodiment, one or more optional catalysts including a mixture of primary or secondary amines and/or morpholine may be injected to the combined sulfur line at point 25 before entering the packed section located above the sulfur collection vessel 40. The packed section 28' may comprise any suitable type of packing, such as a random-type packing material, or optionally one or more catalysts, such as the Claus catalyst. The sulfur collection vessel 40 for this embodiment of the invention has three compartments, A, B, and C, whereby the first and second compartments (A and B, respectively) are separated by an underflow baffle 42, and the second and third compartments (B and C, respectively) are separated by an overflow baffle 44 which thus determines the level in the first and second compartments, A and B. Both underflow baffle 42 and overflow baffle 44 are preferably solid plate baffles, although any suitable baffle for the desired purpose may be used in accordance with this invention. In typical operation, semi-degassed sulfur is recycled from the first compartment as motive fluid to the eductors. Final degassing is achieved by air sparging in the second compartment, compartment B, via an air stream 46 to one or more air sparging nozzles 48 designed to promote agitation and mixing within vessel 40. This air sparging also serves to strip out residual catalyst to the extent that such catalyst may be volatile. Thereafter, product sulfur is pumped from the third compartment C to downstream storage or handling facilities via the level control (LC) and level control valve ($V_{LC}$) at a rate that maintains a reasonable liquid level in the third compartment, C.

With continued reference to FIG. 4, the air enters the bottom of the sulfur vessel 40 through one or more sparging nozzles 48 designed to promote optimum agitation and mixing within the storage device. The vent gas containing the $H_2S$ flows to the SRU or incinerator via flow line 26, as desired by the user. The sulfur collection vessel 40, as described above in association with the other process flow diagrams, operates at a pressure ranging from about 5 psig to about 55 psig, inclusive.

Figure 5:
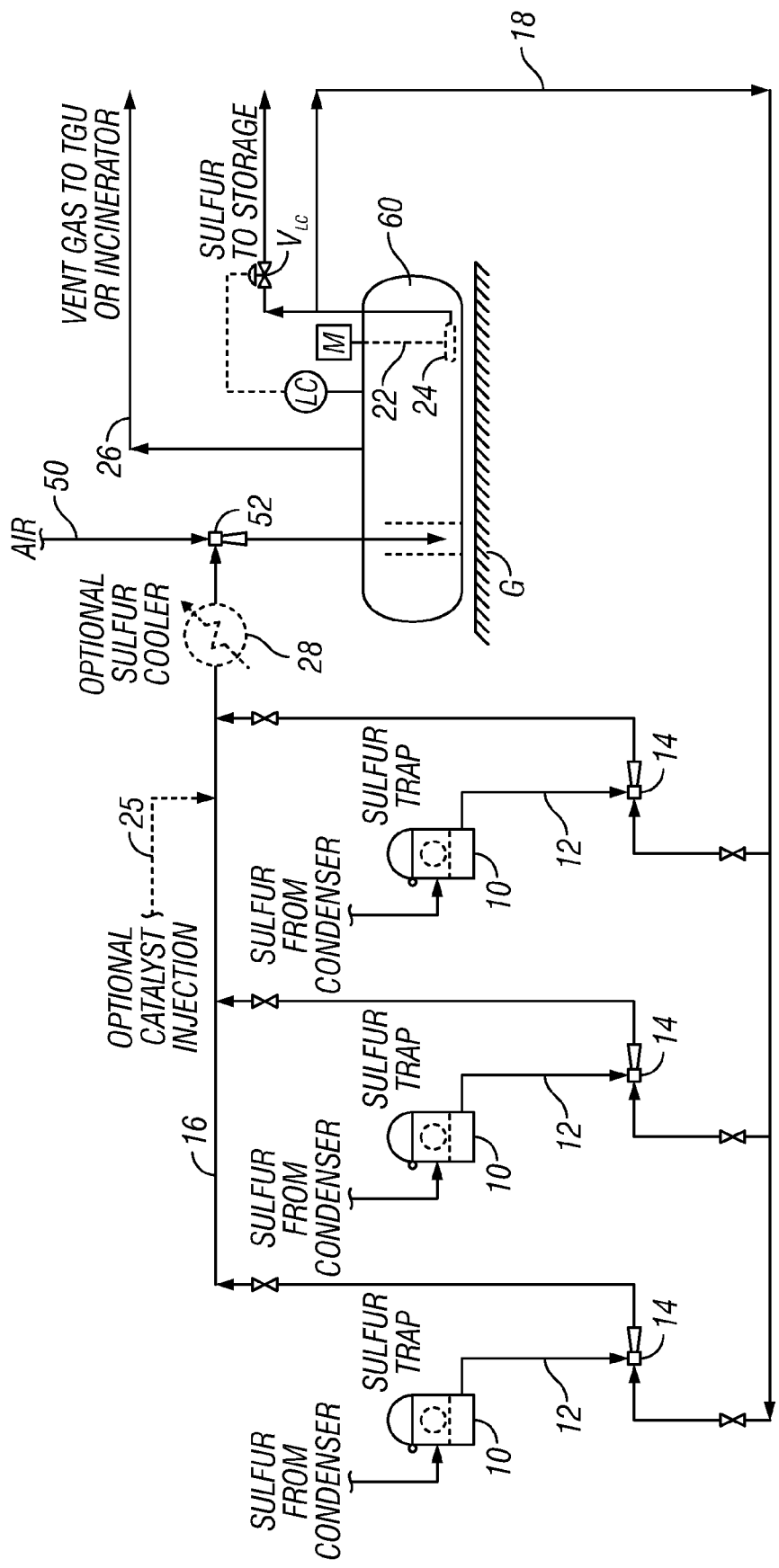
FIG. 5 is a process flow diagram illustrating a sulfur collection process in accordance with embodiments of the present disclosure, wherein the process includes an integrated degassing air sweep.

Referring now to FIG. 5, the liquid sulfur from each sulfur condenser flows via an optional seal or trap 10 to one or more liquid sulfur eductors 14 via flow line 12 to boost the pressure, utilizing motive liquid sulfur recycled by the sulfur pump from the sulfur collection vessel and conveyed fluid line 18. The liquid sulfur then flows to the sulfur collection vessel 60 by way of a liquid distributor which acts to maintain the fluid turbulence velocity required for effective degassing. The eductor discharge is then combined in one header 16 where there is turbulent mixing of the liquid sulfur and the $H_2S$ is separated from the sulfur. A conventional cooler 28 may be optionally provided to optimize the temperature of the liquid sulfur. A catalyst, such as a mixture of primary and/or secondary amines and/or morpholine (without limitation), is then optionally injected into the combined sulfur line at point 25 before the sulfur enters the sulfur collection vessel 60. As shown in FIG. 5, the sulfur collection vessel 60 in accordance with this aspect of the invention does not have the top packed section. Rather, compressed air 50 is injected into the liquid sulfur line with the proper velocity using a proper mixing device 52, such as an eductor, so as to strip the $H_2S$ from the liquid sulfur. The sulfur collection device 60 has only one internal compartment, and the degassed sulfur is pumped to secondary storage or transportation vessels, as appropriate and discussed above with reference to the other figures. As with other embodiments described herein, the collection vessel 60 vents to the SRU or incinerator via effluent line 26. As described in association with other aspects of the present disclosure, the sulfur collection vessel 60 in the process of FIG. 5 preferably operates at a pressure ranging from about 5 psig to about 55 psig, inclusive.

In accordance with the present disclosure, and with particular reference to FIG. 5, when air is injected to the sulfur line as part of the degassing process, the need for a packed section is eliminated due to continued agitation within the vessel itself. This is because the air that is injected into the sulfur drum creates a turbulence of sufficient velocity adequate to separate the hydrogen sulfide ($H_2S$) from the liquid sulfur. When the liquid sulfur is flushed with air, however, it is essential that the air flow rate be sufficient to separate the hydrogen sulfide from the liquid sulfur, but simultaneously limit the resultant $H_2S$ concentration in the space to safely below the ignition temperature or lower explosive limit. Consequently, the air flow rate should be calculated so as to maintain a safe process facility operation.

In accordance with aspects of the present disclosure, certain benefits may be associated with the several processes described and illustrated in the figures. For example, in accordance with the processes shown in FIGS. 3, 4, and 5, the liquid sulfur product after undergoing the processes of the instant disclosure will contain about 10 ppmw or less of $H_2S$. With reference to FIG. 4 and FIG. 5, in accordance with the present disclosure, the stripping air used in the process may be injected into the liquid sulfur pipe via a mixer such as a pipe mixer (not shown), or into the sulfur within the collection vessel via sparging nozzles (such as shown in FIG. 4, for example), so as to achieve a good mixing and effective stripping of $H_2S$ from the liquid phase.

As indicated above, in accordance with certain aspects of the presently disclosed processes, optional liquid catalysts may be added to the system as appropriate, in order to accelerate certain reactions within the liquid sulfur stream, such as to increase degassing efficiency. Suitable liquid catalysts include, but are not limited to, nitrogen-containing compounds, such as alkyl amines, cyclic amines, heterocyclic amines, aromatic amines and anilines. In accordance with one aspect of the present disclosure, the most preferred catalysts include compounds with active nitrogen groups such as morpholine, quinoline, ammonia, and urea. Other representative catalysts suitable for use herein are those compounds containing at least one HN-functional group, including but not limited to the mono and di-amino alkanes and their substituted analogs, e.g., ethylamine and diethanolamine; aromatic diamines, e.g., phenylene diamine, diamino naphthalenes; heterocyclic amines, e.g., morpholine, pyrrole, pyrrolidine, imidazole, imidazolidine, piperidine, and melamine, as well as their substituted analogs. U.S. Reissue Pat. No. 32,009 issued to Ledford, et al. also describes a list of suitable catalysts for use with the processes of the present disclosure, and which is incorporated herein by reference for all purposes and to the extent that it is not inconsistent with the present invention as described and claimed.

Other and further embodiments utilizing one or more aspects of the inventions described above can be devised without departing from the spirit of Applicant's invention. For example, the process may include multiple stages, or may include loops within the process stages described. Further, the various methods and embodiments of the sulfur collection systems and collection processes disclosed herein can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps.

Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. A method of collecting individual rundown streams of produced sulfur as from the sulfur condensers of a typical Claus sulfur recovery unit, the method comprising:
   pumping a liquid sulfur recycle stream from a sulfur collection vessel;
   directing each of the rundown streams of produced sulfur to one or more jet pumps or eductors via a sulfur trap or liquid sulfur seal; and
   conveying the collective discharge streams from the one or more jet pumps or eductors by a common conduit to the sulfur collection vessel;
   wherein the liquid sulfur recycle stream serves as the motive fluid to a jet pump or eductor which serves to boost the pressure of the rundown stream from a conventional liquid seal or trap,
   the sulfur collection vessel is operated at a positive pressure with a blanket atmosphere of process gas capable of being safely vented to a process, and
   wherein the collection vessel and/or collection piping is located above ground.

2. A process in accordance with claim 1 wherein conventional liquid seals or traps on the individual sulfur rundown streams are replaced with flow restriction orifices.

3. A process in accordance with claim 1 whereby inherent turbulence within the eductors and downstream piping generates agitation and shear forces conducive to accelerated decomposition of unwanted hydrogen polysulfides so as to achieve a substantial degree of $H_2S$ removal from the sulfur, commonly referred to as "degassing," within the collection system.

4. A process in accordance with claim 3 wherein:
   minor entrained process gas further contributes to agitation conducive to polysulfide decomposition; and
   $SO_2$ in the entrained process gas further contributes to polysulfide decomposition by the oxidation of weakly bound $H_2S$.

5. A process in accordance with claim 1, further comprising introducing a gaseous or liquid catalyst designed to promote accelerated polysulfide decomposition.

6. A process in accordance with claim 5, wherein the catalyst is an amine, a mixture of an amine and morpholine, or any nitrogen-containing compound.

7. A process in accordance with claim 1, further comprising contacting the collective sulfur rundown streams with a fixed bed of solid catalyst designed to promote accelerated polysulfide decomposition.

8. A process in accordance with claim 7 wherein the catalyst is one effective in promoting the Claus reaction.

9. A process in accordance with claim 1 wherein the sulfur collection vessel operates at a gas blanket pressure limited to about 55 psig.

10. A process in accordance with claim 3 wherein the degassed liquid sulfur has a total hydrogen sulfide content of less than about 100 ppmw.

11. A process in accordance with claim 3, further comprising contacting the collective rundown sulfur with sulfur collection vessel sweep gas within a packed bed for enhanced degassing.

12. A process in accordance with claim 3, wherein air is introduced to the system so as promote accelerated polysulfide decomposition by the oxidation of weakly bound $H_2S$.

13. A process in accordance with claim 12, wherein the air is bubbled into the liquid sulfur pipe from the bottom using a pipe mixer, an air sparger, or an air distributor inside of the sulfur drum in order to achieve good mixing and to strip the $H_2S$ from the liquid phase.

14. A process in accordance with claim 12, wherein compressed air is injected, via a proper dispersion device, into the collective sulfur rundown stream upstream of the collection vessel.

15. A process in accordance with claim 1 wherein the sulfur storage vessel has multiple compartments.

16. A process in accordance with claim 1 wherein the liquid sulfur collection vessel is blanketed with a portion of, or the entire, SRU or TGU tail gas stream.

17. A process in accordance with claim 1 wherein the collective sulfur rundown stream is adjusted, by heating or cooling, to a temperature of about 130 to about 145° C. for maximum degassing efficiency.

18. A method for the removal of hydrogen sulfide from a liquid sulfur stream, the method comprising:
   contacting a liquid sulfur stream containing hydrogen sulfide ($H_2S$) from one or more sulfur condensers with one or more eductors;
   combining the eductor discharges into a single header assembly;
   subjecting the discharges in the header assembly to turbulent mixing;
   separating the $H_2S$ from the liquid sulfur;
   transferring the liquid sulfur to an above-ground sulfur drum by way of a liquid distributor to maintain turbulent velocity; and
   transferring the degassed liquid sulfur to an appropriate storage assembly.

19. A process for degassing liquid sulfur containing polysulfides and hydrogen sulfide, the process comprising the steps of:
   introducing under pressure one or more streams of liquid sulfur containing polysulfides and hydrogen sulfide into one or more eductors via one or more sulfur traps or sulfur liquid seals;
   mixing the liquid streams exiting from the eductors in a header assembly so as to provide intimate contact between the two streams;
   passing the two streams while in intimate contact with one another through an above-ground sulfur vessel while maintaining a pressure of more than about 5 psig, at a temperature and for a treatment time sufficient to remove substantially all of the polysulfides and hydrogen sulfide from the liquid sulfur and to produce a stream of degassed liquid sulfur and a stream of waste effluent gas; and
   discharging the degassed liquid sulfur from the vessel.

20. A process in accordance with claim 19 further comprising introducing a catalyst for promoting the oxidation of the polysulfides and hydrogen sulfide to elemental sulfur into the fluid stream prior to the fluid stream entering the sulfur drum.

* * * * *